United States Patent [19]

Kutowy

[11] Patent Number: 5,624,555
[45] Date of Patent: Apr. 29, 1997

[54] FLUID FRACTIONATING, STACKED PERMEABLE MEMBRANE ASSEMBLY

[75] Inventor: Oleh Kutowy, North Gower, Canada

[73] Assignee: National Research Council of Canada, Ottawa, Canada

[21] Appl. No.: 130,983

[22] Filed: Oct. 4, 1993

[51] Int. Cl.$^6$ ..................................................... B01D 63/00
[52] U.S. Cl. .............................. 210/321.75; 210/321.84; 210/346; 210/456; 210/224; 210/232; 277/135
[58] Field of Search ........................ 210/321.6, 321.75, 210/321.84, 231, 232, 346, 456, 460, 486; 137/547; 277/135

[56] References Cited

U.S. PATENT DOCUMENTS

| | | | |
|---|---|---|---|
| 3,494,469 | 2/1970 | Kohl et al. | 210/346 |
| 3,837,496 | 9/1974 | Hagstrom et al. | 210/321.75 |
| 3,841,491 | 10/1974 | Hagström et al. | 210/321.75 |
| 4,631,130 | 12/1986 | Watanabe | 210/346 |
| 5,002,667 | 3/1991 | Kutowy et al. | 210/321.75 |
| 5,076,923 | 12/1991 | Hilgendorff et al. | 210/321.75 |

Primary Examiner—Robert A. Dawson
Assistant Examiner—Ana M. Fortuna

[57] ABSTRACT

The invention disclosed is a stacked, permeable membrane assembly, comprising two clamping plates with spaced, permeable membrane assemblies between them on a simplified frame. Each membrane assembly includes a membrane support means, conveniently a rigid screen, covered by a pair of membranes. The frame is designed to retain the membrane-covered support in internal grooves. Additional membrane support plates and sealing collars are not required.

13 Claims, 6 Drawing Sheets

FLUID FRACTIONATING, STACKED PERMEABLE MEMBRANE ASSEMBLY

This invention relates to a fluid fractionating, stacked permeable membrane assembly with integrally sealed membranes at the fluid distribution ports.

It has already been proposed in applicant's U.S. Pat. No. 5,002,667 dated Mar. 26, 1991, Oleh Kutowy, John D. Hazlett, Thomas W. McCracken and Adam Bennett, to provide a stacked permeable membrane assembly with a fluid distributing and permeable membrane sealing collar. The assembly of supporting plates and membrane pairs are sealed from the pressurized feed fluid with distributing collars which also serve as fluid distributors. While this apparatus is useful, the numerous distributing and sealing collars are difficult to install, and are costly from the material and labour standpoint. Although sealing collars are useful in general, there is also a danger that they may not adequately seal the membrane at the position of the higher pressure feed flow channel where the collars are supposed to seal the membrane from the low pressure permeate. Sealing collars also take space away from the permeation area of the membrane support and are subject to deposition of fibrous material when separating fluids containing such materials.

Accordingly, there is a need for a fluid fractionating, stacked membrane envelope assembly wherein the feed fluid has an adequate and unrestricted flow path which is independent of the nature of the fluid being fractionated between the membrane assemblies and the support within the membrane assembly provides an adequate escape for the permeate from the membranes.

According to one embodiment of the present invention, there is provided a fluid fractionating, stacked permeable membrane assembly, comprising:

a) two clamping plates in spaced, face to face relationship, the facing surfaces of each plate having sealing rims bounding pressurized feed fluid recesses, inlet plenum recesses at facing first ends and outlet plenum recesses at the facing second ends, a fluid inlet port to the inlet plenum recess of one plate, and a feed fluid outlet port from the outlet plenum recess of the other plate, b) a stack of spaced permeable membrane assemblies between the plates, each membrane assembly comprising:

i) a frame shaped to extend between the sealing rims and having permeable outlet means extending through the frame from the interior thereof, ii) a pair of limited flexibility membrane support plates sealed to the frame, the pair of support plates being shaped to provide within that frame, intermediate, spaced, fluid permeable plate portions forming an inner permeable cavity between them communicating with the permeate outlet means, and outer feed fluid recesses aligned with or in fluid communication with those in the plates, and at each end, adjacent plate portions having fluid passages therethrough and forming plenum recesses aligned with those in the plates, the feed fluid passages being aligned and in communication with the ports in the clamping plates, and iii) for each support plate, a pair of fluid permeable membranes covering the outer surfaces of that support plate and having fluid passages aligned with the fluid passages in that support plate, said pair of membranes being sealed to each other at the marginal edge of the fluid passages in a fluidtight engagement with the support plate covered thereby, and c) means for clamping the clamping plates, and the stack of membrane assemblies between them in a fluidtight manner.

In this embodiment of the present invention additional support means may be provided to support each membrane support plate against collapsing into the permeate cavity bounded thereby. The support means may be an open mesh or screen filling each permeate cavity. The support means may also comprise a portion of the support plate being made of an expanded metal or a perforated rigid plastics materials.

The membranes may be sealed at the marginal edges of the fluid passages by any one of a number of convenient means such as gluing with an appropriate adhesive such as an epoxy resin, a urethane resin, a room temperature vulcanizing silicone rubber and a novolac resin; sealing with heat provided by electrical resistance, hot air or ultrasound, or a combination of sealing and providing a protective cap for the exposed surface.

Also in this embodiment of the present invention there may be provided a substantially smooth plastics material cap to protect the exposed marginal edges or perimeter of the membranes at the feed fluid passages from unnecessary wear and to prevent the deposition of fibrous material thereon. Suitable materials for the cap include nylon, polypropylene, polysulfone, ABS resin and polyvinylidene fluoride. The cap may also have a solid center to prevent flow of feed fluid from passing, and thus diverting that flow of feed fluid.

Each membrane support plate may be shaped to have stiffening ridges extending along the feed fluid recesses.

Each membrane support plate may also be provided with annular membrane sealing ridges extending around an exposed side thereof to assist in the sealing of the membranes from outward leakage of the pressurized feed fluid.

Alternatively, each membrane support plate may be provided with groove extending around an exposed side, wherein can be placed an "O" ring or other gasketing material.

Each membrane support plate is made of a suitable high strength material, such as stainless steel, brass, bronze, aluminum or other alloys which may be suitable to minimize corrosion in any particular separation application.

According to a second embodiment of the Invention, there is provided a fluid fractionating, stacked permeable membrane assembly, comprising a) two clamping plates in spaced, face to face relationship, with respective facing surfaces of each plate having sealing rims bounding pressurized feed fluid inlet plenum recesses at facing first ends and outlet plenum recesses at the facing second ends, a feed fluid inlet port to the inlet plenum recess of one plate, and a feed fluid outlet port from the outlet plenum recess of the other plate, b) a stack of spaced permeable membrane assemblies between the plates, each membrane assembly comprising:

i) a frame extending between the sealing rims and having permeate outlet means extending through the frame from the interior thereof, ii) fluid permeable membrane support means attached to the frame, said support means including feed fluid passages at each end thereof, wherein adjacent membrane assemblies said feed fluid passages are aligned with each other and the feed fluid inlet and outlet ports, respectively, and iii) a pair of fluid permeable membranes respectively covering the membrane support means and the frame, and having feed fluid passages aligned with the feed fluid passages in the membrane support means, wherein the pair of membranes is sealed to each other at the marginal edge of each of said feed fluid passages in a fluid tight manner, and c) means for clamping the clamping plates and the stack of membrane assemblies between them, in a fluid tight manner.

BRIEF DESCRIPTION OF DRAWINGS

In the accompanying drawings which illustrate, by way of example, an embodiment of the present invention.

DETAILED DESCRIPTION

Figure 1:
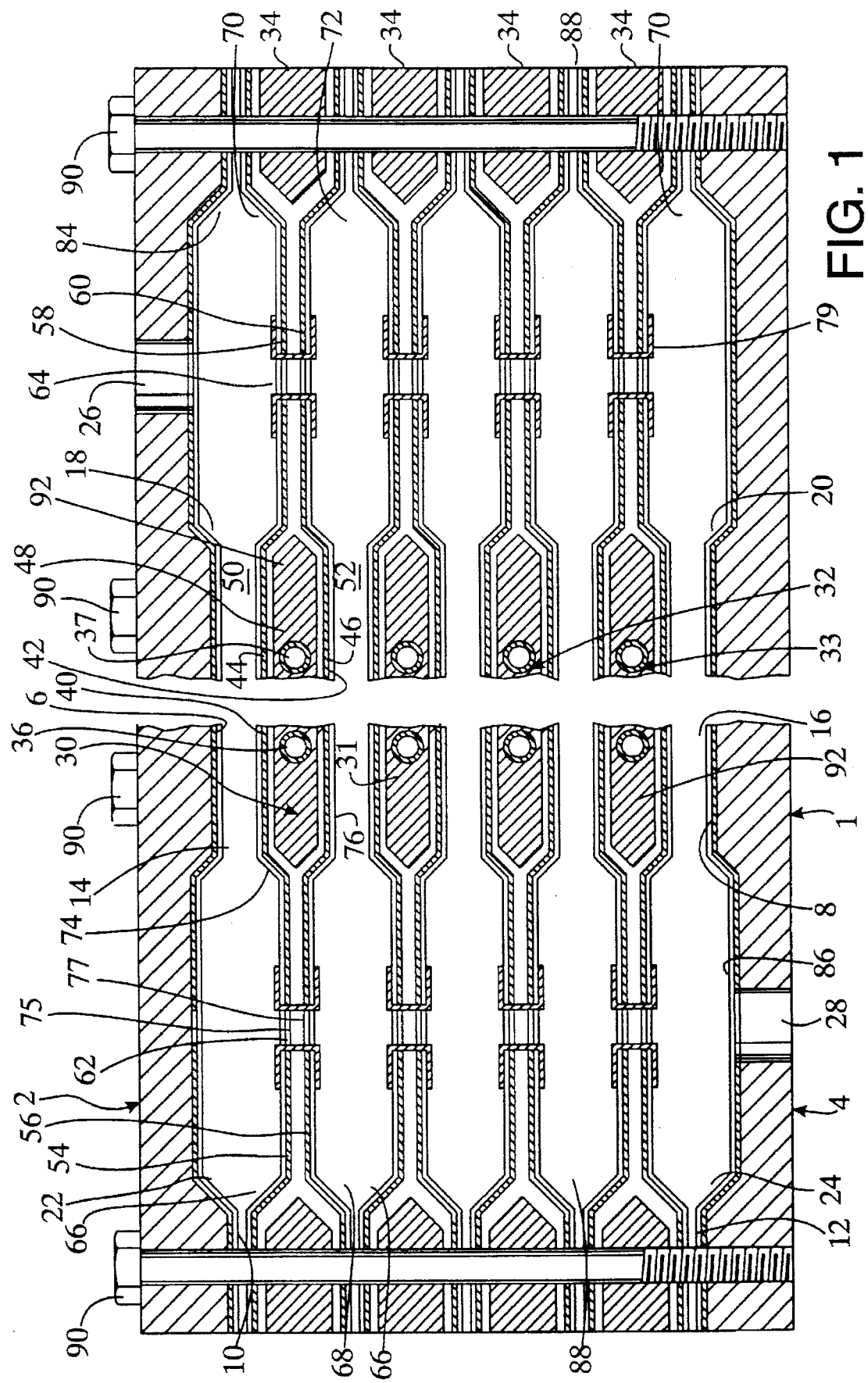
FIG. 1 is a partly sectioned, exploded, side view along I—I, FIG. 2, of an end portion of a fluid fractionating, stacked permeable membrane assembly.

Referring now to FIGS. 1 to 4, there is shown a fluid fractionating, stacked permeable membrane assembly, generally designated 1, comprising:

a) two clamping plates 2 and 4 in spaced, face to face relationship with the facing surfaces, 6 and 8 respectively, of each plate 2 and 4 having sealing rims, 10 and 12 respectively, bounding feed fluid recesses, 14 and 16 respectively, with inlet plenum recesses 18 and 20 respectively at facing first ends and outlet plenum recesses, 22 and 24 respectively at facing second ends, a feed fluid inlet port 26 to the inlet plenum recess 18 of the plate 2, and a feed fluid outlet port 28 from the outlet plenum recess 24 of the plate 4, b) a stack of spaced permeable membrane assemblies generally designated 30 to 33 between the plates 2 and 4, each membrane assembly 30 to 33 comprising:

i) a frame 34 shaped to extend between the sealing rims 10 and 12 and having permeate outlet means, in the form of tubes 36 to 39, (FIGS. 1 and 2), extending through the frame 34 from the interior thereof, ii) a pair of limited flexibility membrane support plates 40 and 42 sealed to the frame 34, the pair of support plates 40 and 42 being shaped to provide within that frame 34, intermediate, spaced, fluid permeable plate portions 44 and 46, having perforation or porosity 47, (FIG. 2), and forming an inner permeate cavity 48 between them, communicating with the permeate outlet tubes 36 to 39, and outer feed fluid recesses 50 and 52 aligned with those in the plates 2 and 4, and at each end, adjacent plate portions 54, 56 and 58, 60 having feed fluid passages, 62 and 64 respectively, therethrough and forming plenum recesses 66, 68 and 70, 72 respectively, aligned with those designated 22, 24 and 18, 20 respectively, in the plates 2 and 4, the feed fluid passages 62 and 64 being aligned with the ports 28 and 26 respectively, in the clamping plates 2 and 4, and iii) a pair of fluid permeable membranes, 74 and 76 for each support plate 40 and 42 respectively, covering the outer side of that support plate and having feed fluid passages aligned with the fluid passages 62 and 64 in that support plate 40 or 42, a marginal edge portion of each membrane 74 and 76 around each fluid passage therein, being sealed to each other by means of glue or heat sealed, against the support plate 40 or 42 covered by that membrane 74 or 76, (c), optionally, a plurality of membrane fluid passage protector caps 79 in intimate contact with the sealed edges of the membranes bounding the i) the plenum recesses 18, 20, 22 and 24 in the clamping plates 2 and 4 and the facing plenum recesses 66, 68, 70 and 72 in the support plates adjacent to them, so that one of these protective caps 79 bounds a fluid passage 84, 86 between a clamping plate port 26 and 28 respectively and a support plate fluid passage, 64 and 62 respectively, and ii) the facing plenum recesses 66, 68 and 70, 72 between support plates 40 and 42 so that these protective caps 79 bound fluid passages 88 extending between support plate fluid passages 62 and 64, and d) means, in the form of bolts 90, for clamping the clamping plates 2 and 4, and the stack of membrane assemblies 30 to 33 between them, in a fluidtight manner.

Membrane sealing ridges, such as ridge 91 (FIG. 2) may be provided extending around each membrane support plate 40 or 42. The sealing ridges 92 may be replaced by sealing rings, or gaskets.

In this embodiment of the present invention, support means, each in the form of an open wire mesh filling 92, are provided to support each membrane support plate 40 and 42 against collapsing into the permeate cavity 48 bounded thereby.

Figure 2:
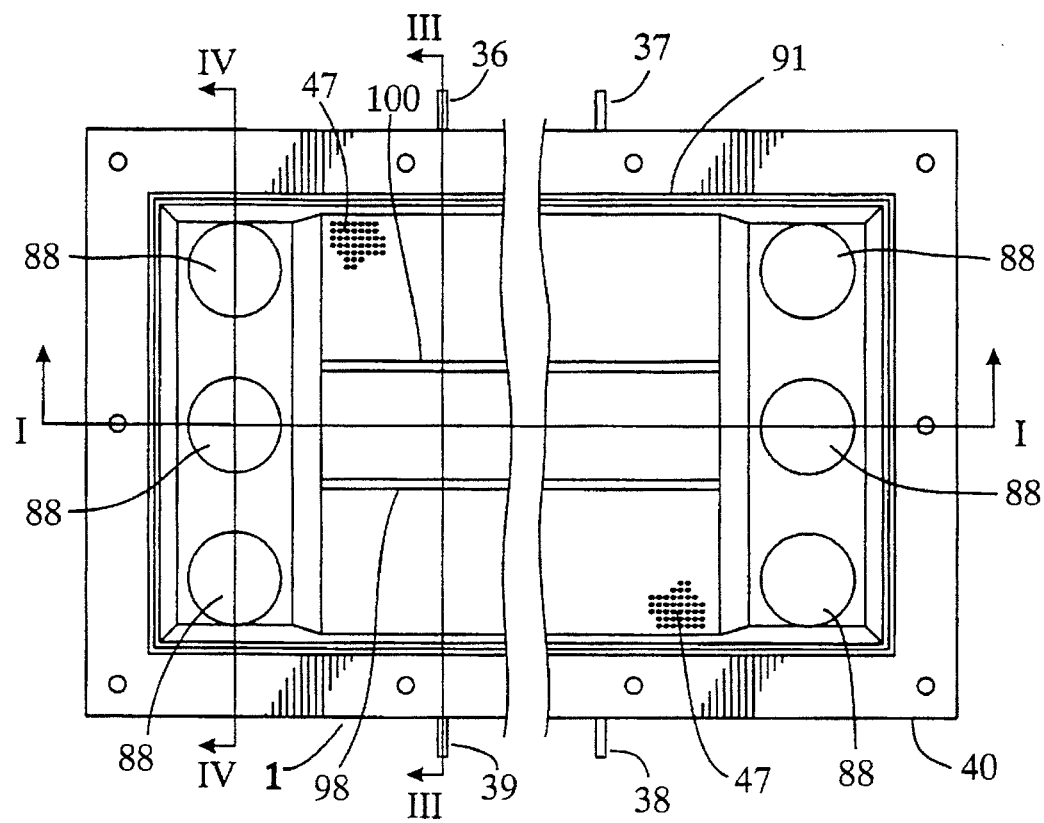
FIG. 2 is a plan view of the assembly shown in FIG. 1, with the top clamping plate and the clamping bolts removed.
Figure 3:
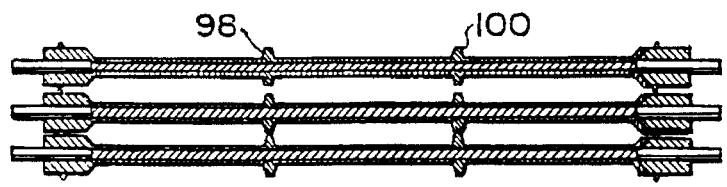
FIG. 3 is a diagrammatic, sectional and view along III—III, FIG. 2, of a membrane portion of the assembly.
Figure 4:
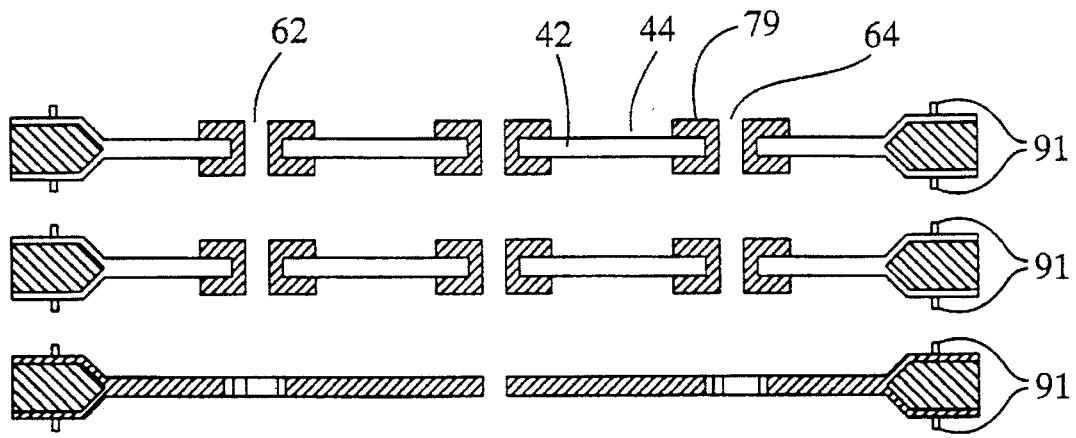
FIG. 4 is a diagrammatic, sectional end view along IV—IV, FIG. 2, of a feed fluid passage portion of the assembly.
Figure 5:
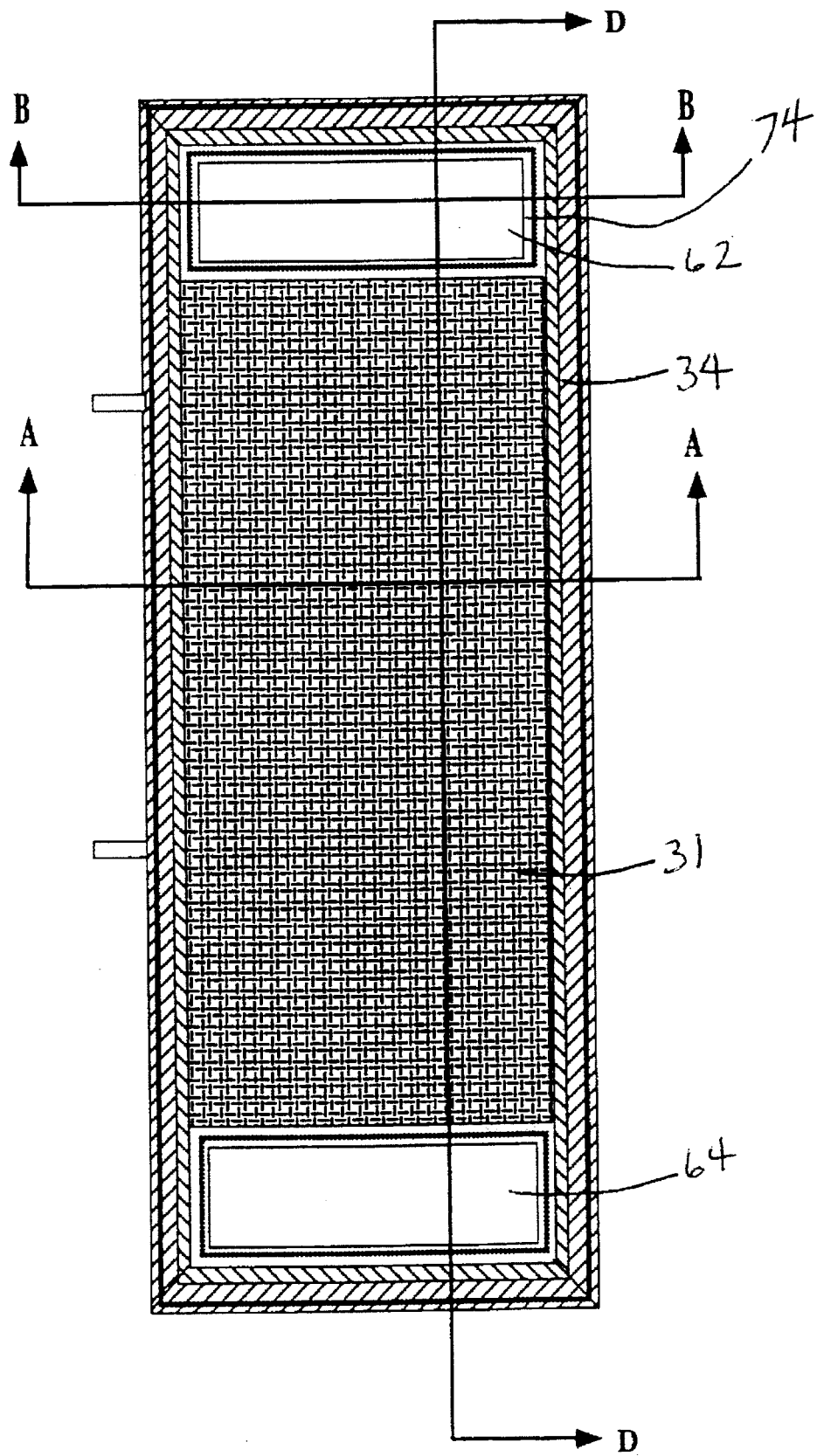
FIG. 5 is a top view of the frame according to a second embodiment of the invention, with the end plate not shown.

As shown in FIGS. 2 to 4, the plenum recesses 22, 24, 66, 68, 70 and 72 of FIG. 1 are elongated to extend along each end of the feed fluid recesses 50 and 52, the fluid inlet and outlet ports, 26 and 28 respectively, are each one of a plurality of similar fluid ports spaced along their respectively plenum recesses, the fluid passages 62 and 64 are each one of a plurality of similar fluid passages through the membrane supports and the membranes, and the protective caps 79 are each one of a plurality of similar caps provided for each fluid passage 62 and 64 respectively.

The membrane support plates are preferably made of a porous material selected from porous metal, perforated metal, porous plastics material and perforated plastics material.

Each membrane support plate may be shaped to have stiffening ridges 98 and 100 extending along the feed fluid recesses 50 and 52.

With the apparatus arranged as shown in FIGS. 1 and 2, the clamping plates 2 and 4, and membrane assemblies 30 to 33, are clamped together in a fluidtight manner by the bolts 90, and the caps 79 are attached to the membranes 74 and 76 after said membrane are first sealed together in a fluidtight manner against each other and the membrane support plates 40 and 42 respectively.

A feed fluid is fed under pressure to the fluid inlet ports 26 and is distributed by the plenum recesses 22, 24, 66, 68, 70 and 72 to flow along the recesses 50 and 52 and out of the port 28. As the feed fluid flows along the recesses 50 and 52, permeate of the feed liquid permeates the membranes 74 and 76 and flows along the cavities 48 and exits through the tubes 36 to 39.

Preferably, each plate 102 or 104, are made of high strength material, e.g. stainless steel, brass, bronze, aluminum and other suitable metal alloys.

Preferably each protective cap is made of strong plastics material. e.g. Polypropylene, Nylon, Ester resin, Polysulfone, Polyvinyledene fluoride.

The permeable membrane may be supported or unsupported assymetric membranes made of cellulosic materials, e.g. cellulose acetate, a family of polysulfones such as e.g. Radel®, Polyvinyledene fluoride and their copolymers, as well as any other suitable aromatic or aliphatic membrane. For some applications the unsupported membranes may include a cushioning support to maintain the shape of the membrane.

Turning to FIGS. 5 to 8, in the second embodiment of the invention, there is provided a fluid fractionating, stacked permeable membrane assembly, comprising two clamping plates 2 and 4 in spaced, face to face relationship, with the respective facing surfaces 6 and 8 of each plate having sealing rims 10 and 12 bounding pressurized feed fluid inlet plenum recesses 14 and 16 at facing first ends and outlet plenum recesses 22 and 24 at the facing second ends, a feed fluid inlet port 26 to the inlet plenum recess of one plate and a feed fluid outlet port 28 from the outlet plenum recess of the other plate.

It is also seen that a stack of spaced permeable membrane assemblies generally indicated as 30 is provided between the plates 2 and 4. Each membrane assembly 30 includes a frame 34 extending between the sealing rims 10 and 12 and includes permeate outlet means 36 extending through the frame from the interior thereof.

Figure 6A:
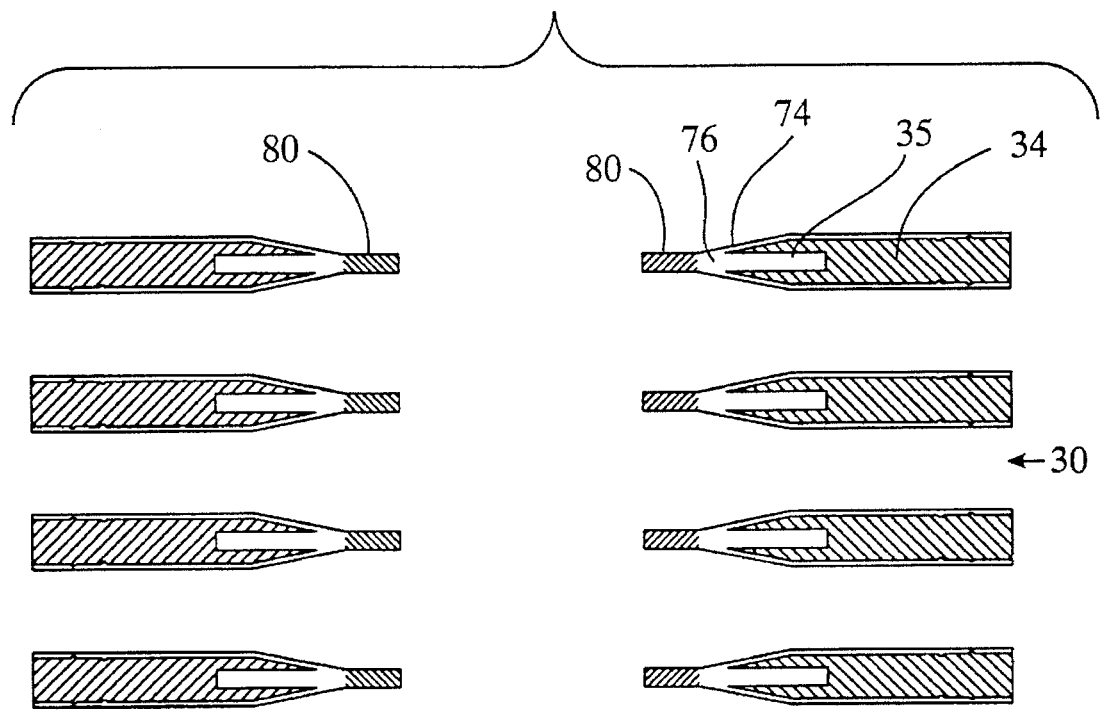
FIG. 6A is a side elevation in section taken along section line B—B in FIG. 5, where the end plate is not shown.
Figure 6B:
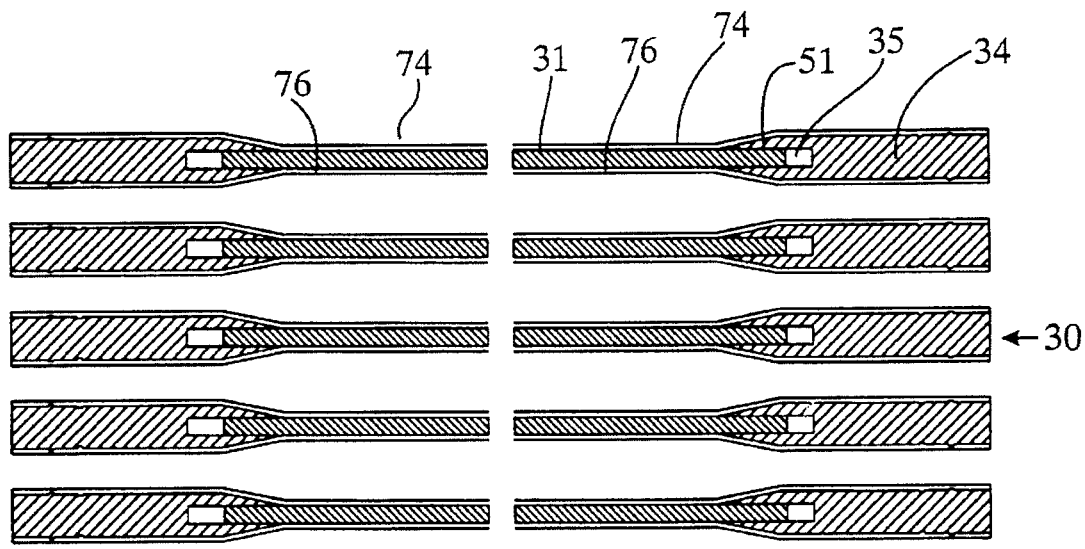
FIG. 6B, as a side elevation in section taken along section line A—A in FIG. 5.
Figure 8:
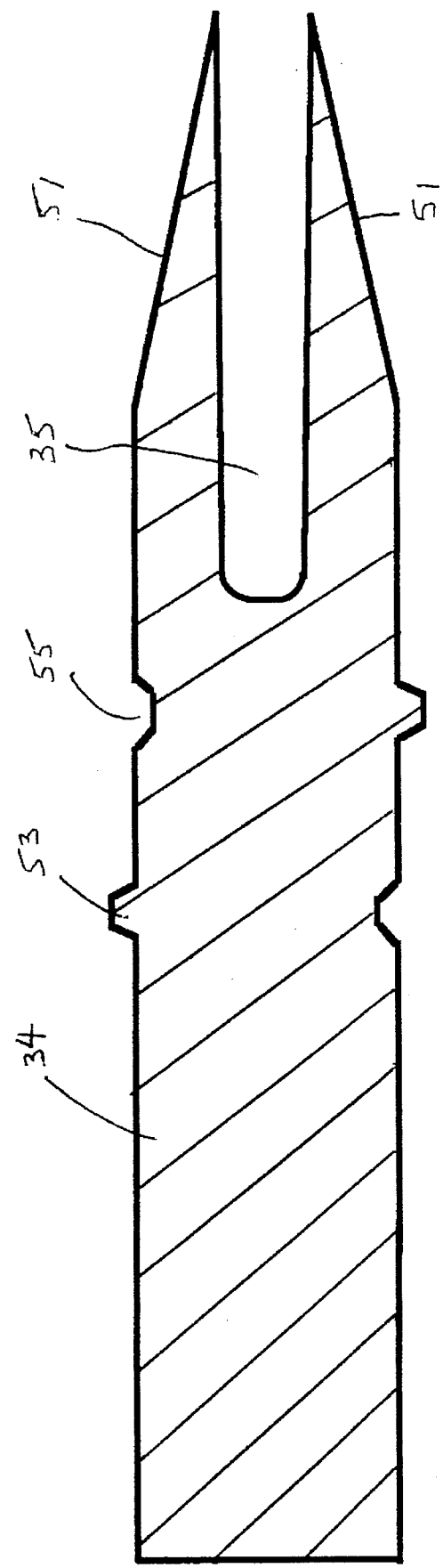
FIG. 8 is a side elevation in section of one of the frame elements according to the second embodiment of the invention.

A fluid permeable membrane support means e.g. in the form of a rigid screen 31 made of a suitable metal or plastics material such as stainless steel screen or epoxy reinforced cloth material is attached to the frame. As best seen in FIG. 6B, the screen 31 is retained in a groove 35, conveniently by a welding or by means of a suitable adhesive. As best seen in FIG. 8, the frame 34 includes inner tapered surfaces 51 converging to a knife-edge and defining the groove 35 therebetween, to provide a smooth transitional surface for membrane attachment and sealing. Lugs 53 and depressions 55 are also provided in the outer surfaces of the frame 34 to facilitate alignment and stacking of the membrane assemblies. The frame is preferably extruded from a suitable metal e.g. brass and aluminum or a suitable thermoplastics material e.g. PVC, PVDF, and other thermoplastics filled or nascent. The frame surface should be smooth and oxide-free to facilitate membrane attachment and prevent leaks.

Figure 7:
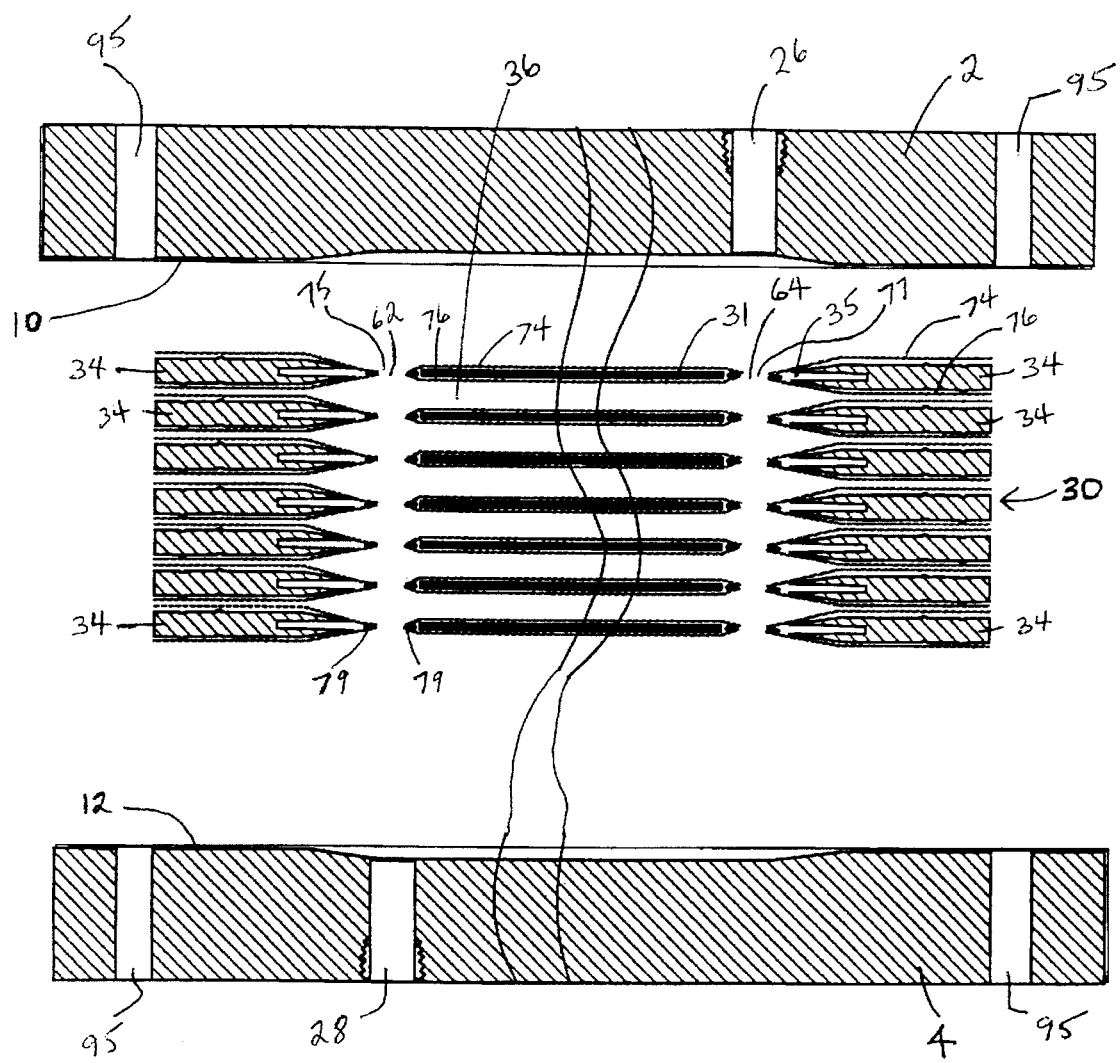
FIG. 7, is a side elevation in section 1 taken along section line D—D in FIG. 5, illustrating the membrane stack assembly.

As best seen in FIG. 7, the screen 31 also includes feed fluid passages 62 and 64 at each end thereof. In adjacent membrane assemblies 30, the feed fluid passages 62 and 64 are aligned with each other and the feed fluid inlet and outlet ports 26 and 28.

A pair of fluid permeable membranes 74 and 76 which may have additional support in the form of a cloth material either woven or nonwoven, referred to as spun bonded in the trade, respectively covering the supporting screen 31 and the frame 34, and having feed fluid passages 75 and 77 aligned with the feed fluid passages 62 and 64 in the support screen 31. The pair of membranes 74 and 76 overlap and are sealed to each other at the marginal edge of each of the feed fluid passages 62 and 64 in a fluidtight manner, as best shown in FIG. 6A at 80.

Means is also provided for clamping the clamping plates 2 and a 4 together in a fluidtight manner. As seen in FIG. 7, openings 95 are provided for insertion of bolts (not shown).

As in the first embodiment, caps 79 can be provided in situations when it is advantageous to protect the edges of the sealed membranes from collecting fibrous materials, or for protection against erosion of the edge by sharp particles.

I claim:
1. A fluid fractionating, stacked permeable membrane assembly, comprising
   a) two clamping plates in spaced, face to face relationship, the facing surfaces of each plate having sealing rims bounding pressurized feed fluid recesses, inlet plenum recesses at facing first ends and outlet plenum recesses at the facing second ends, a feed fluid inlet port to the inlet plenum recess of one plate, and a feed fluid outlet port from the outlet plenum recess of the other plate,
   b) a stack of spaced permeable membrane assemblies between the plates, each membrane assembly comprising:
      i) a frame shaped to extend between the sealing rims and having permeable outlet means extending through the frame from the interior thereof,
      ii) a pair of limited flexibility membrane support plates sealed to the frame, the pair of support plates being shaped to provide within that frame, intermediate, spaced, fluid permeable plate portions forming an inner permeable cavity between them communicating with the permeate outlet means, and outer feed fluid recesses in fluid communication with those in the plates, and at each end, adjacent plate portions having fluid passages therethrough and forming plenum recesses aligned with those in the plates, the feed fluid passages being aligned and in communication with the ports in the clamping plates,
      iii) for each support plate, a pair of fluid permeable membranes covering the outer surfaces of that support plate and having fluid passages aligned with the fluid passages in that support plate, said pair of membranes being sealed to each other at the marginal edge of the fluid passages in a fluidtight engagement with the support plate covered thereby, and a protective cap placed over the sealed edges of the membranes, and
   c) means for clamping the clamping plates, and the stack of membrane assemblies between them in a fluidtight manner.
2. An assembly according to claim 1, wherein the permeable support plate is made of a porous material selected from the group consisting of porous metal, perforated metal, porous plastics material and perforated plastics material.
3. An assembly according to claim 1, wherein the pair of membranes are sealed to each other with an adhesive selected from the group consisting of an epoxy resin, a urethane resin, a room temperature vulcanizing silicone rubber, and a novolac resin.
4. An assembly according to claim 1, wherein the protective cap is made of a material selected from the group consisting of nylon, polypropylene, polysulfone, ABA resin and polyvinyledene fluoride.
5. An assembly according to claim 4, wherein the protective cap includes a solid center to prevent flow of feed fluid from passing, and thus diverting that flow of feed fluid.
6. An assembly according to claim 1, wherein there is a groove on at least one side of each supporting plate to house a sealing means selected from the group consisting of a rubber "O" ring, a shaped elastomeric gasket and thermoplastic shaped sealing member.
7. An assembly according to claim 1, wherein the membrane is made of a material selected from the group consisting of cellulosic materials, polysulfones polyvinylidene fluoride, and co-polymers thereof.
8. A fluid fractionating, stacked permeable membrane assembly, comprising a) two clamping plates in spaced, face to face relationship, with respective facing surfaces of each plate having sealing rims bounding pressurized feed fluid inlet plenum recesses at facing first ends and outlet plenum recesses at the facing second ends, a feed fluid inlet port to the inlet plenum recess of one plate, and a feed fluid outlet port from the outlet plenum recess of the other plate, b) a stack of spaced permeable membrane assemblies between the plates, each membrane assembly comprising:

i) a frame extending between the sealing rims and having permeate outlet means extending through the frame from the interior thereof, ii) fluid permeable membrane support means attached to the frame, said support means including feed fluid passages and each end thereof, wherein adjacent membrane assemblies said feed fluid passages are aligned with each other and the feed fluid inlet and outlet ports, respectively, iii) a pair of fluid permeable membranes respectively covering the membrane support means and the frame, and having feed fluid passages aligned with the feed fluid passages in the membrane support means, wherein the pair of membranes is sealed to each other at the marginal edge of each of said feed fluid passages in a fluid tight manner, and a protective cap placed over the sealed edges of the membranes, and c) means for clamping the clamping plates and the stack of membrane assemblies between them, in a fluidtight manner.

9. An assembly according to claim 8, wherein the membrane support means is in the form of a rigid screen.

10. An assembly according to claim 9, wherein the frame includes inner tapered edges defining a groove therebetween for receiving the screen, and the screen is welded in place.

11. An assembly according to claim 8, wherein the pair of membranes are sealed to each other with an adhesive selected from the group consisting of an epoxy resin, a urethane resin, a room temperature vulcanizing silicone rubber, and a novolac resin.

12. An assembly according to claim 8, wherein the permeable membrane is made of a material selected from the group consisting of cellulosic materials, polyvinylidene fluoride and polysulfones.

13. An assembly according to claim 8, wherein the protective cap is made of a material selected from the group consisting of nylon, polypropylene, polysulfone, ABA resin and polyvinylidene fluoride.

* * * * *